UNITED STATES PATENT OFFICE.

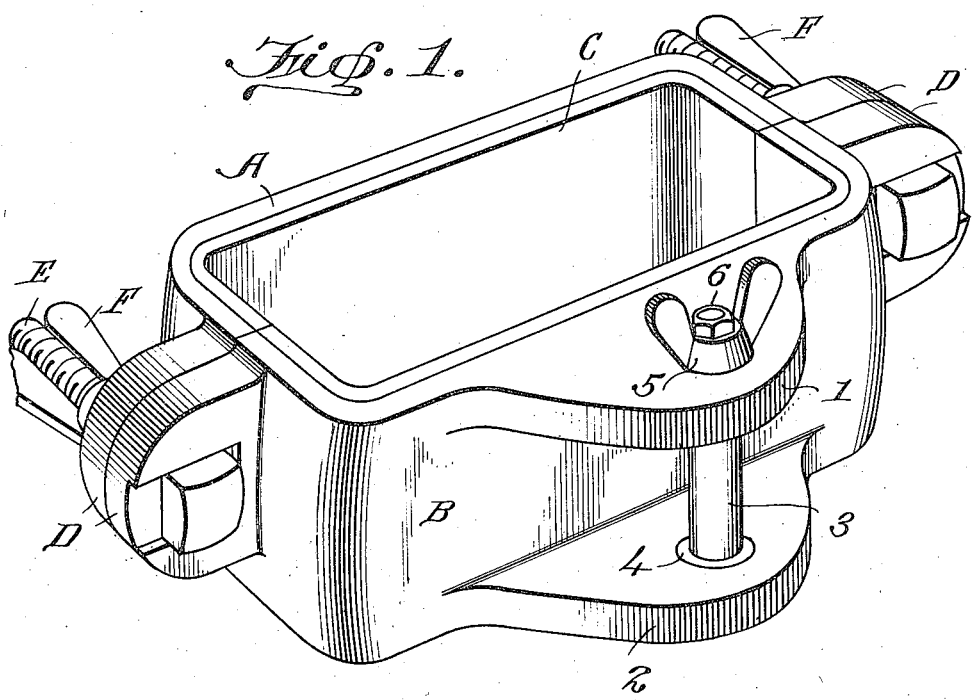

WILLIAM H. McLAUGHLIN, OF HARTFORD, CONNECTICUT, ASSIGNOR TO CASSIUS S. CHASE, OF HARTFORD, CONNECTICUT.

FASTENING MEANS.

1,263,086.  Specification of Letters Patent.  Patented Apr. 16, 1918.

Application filed August 28, 1917. Serial No. 188,650.

*To all whom it may concern:*

Be it known that I, WILLIAM H. McLAUGHLIN, a citizen of the United States, residing at Hartford, in the county of Hartford and State of Connecticut, have invented certain new and useful Improvements in Fastening Means, of which the following is a specification.

This invention relates to fastening means or clamps, more particularly to one of the plates or members of a two-plate clamp, and resides especially in the means for readily securing thereto or therein the links of a chain or part or parts of some element or elements, and in provision for locking said means in position.

The invention hereinafter set forth and described is in the form of a clamp and is intended primarily by applicant for use in attaching anti-skidding chains, of the fixed point type, to the spokes of an automobile truck wheel. However, the invention may be embodied in a number of other different forms of plates to be fixed in position in various manners. Likewise, while primarily intended for use with anti-skidding devices, as above mentioned, it can be used equally well for a great variety of purposes.

The object of the present invention is to provide a plate with a pin arranged at an interval from the parallel face thereof and having a portion, in normal position, located between two rigid surrounding parts, which pin is to have releasable locking means permitting it to be released and moved endwise slightly so that the links of a chain may be slipped over the end of the pin and, when it is locked in its normal position, held by the portion of said pin between said rigid parts. Other objects are to so form the pin, clamp plate and locking means that the pin cannot be removed until the locking means are removed from the pin and sufficient clearance provided adjacent the other end of the pin to allow it to be moved lengthwise in the direction of said end until clear of said rigid parts; to combine in the locking means the two functions of locking the pin and of a powerful pulling and pushing device to pull the pin free in case it gets stuck by freezing or other causes and to push it back into position after the chain links have been slipped over the end thereof in case the hole 7 or the part 4 of the pin is clogged or coated with ice, mud, dirt or other obstructive agent.

Further objects are to improve and simplify such devices, to simplify and improve the locking means, and to reduce the cost of manufacture of such articles, while increasing their efficiency and durability, all of which objects are accomplished by the construction, combination and arrangement of parts all as hereinafter more particularly set forth and described.

In the accompanying drawings, in which only the preferred form is illustrated:

Figure 1 represents a perspective view of a clamp embodying my invention;

Fig. 2, a detail perspective view of the pin, locking nut and guard nut in superposed arrangement, the locking nut being partly in section;

Fig. 3, a cross-sectional view through the flanged plate B, the pin 3 being shown in side elevation; and Fig. 4, a similar view, the pin being omitted.

Referring now in detail to the drawings, A and B indicate the respective clamp plates having a rubber treated lining C and provided with perforated end flanges D for the reception of bolts E on which wing nuts F are screwed to draw the two plates toward each other on some intervening object, as usual.

All of the parts as thus far described are old and well known.

The plate B is provided with two projecting parts or flanges 1 and 2, preferably, though not necessarily, integral and preferably parallel to each other. The flange 1 is provided with an internally screw-threaded perforation 8 and the flange 2 is provided with a hole 7, which is of greater diameter than the perforation 8. Hole 7 and perforation 8 have a common axial line.

A pin 3 is inserted through the hole 7 of flange 2 and is provided with a preferably integral enlargement 4 at one end, which enlargement is of such size and shape as to fit snugly in the hole 7, but is too large to pass through the perforation 8. This pin 3 may be inserted through the hole 7 and through perforation 8 until the enlargement 4 strikes against the face of flange 1 adjacent to perforation 8.

The other end of pin 3 is provided with a shoulder 10 and a reduced stem 9, which has its outer end screw threaded. A locking nut or externally screw-threaded sleeve 5, which is preferably provided with wings and has an internal shoulder 11, is slipped over said stem until its shoulder 11 abuts against the shoulder 10 of pin 3, when the outer face of said nut 5 will be below the threads on stem 9. A guard nut 6 is then turned on the threaded part of stem 9 and holds locking nut 5 against movement longitudinally of said pin 3 while permitting it to rotate freely thereon. As thus assembled the pin 3 may be shoved through the perforation 8 until the threads of the nut 5 engage with the threads of the walls of said perforation, when the nut 5 is to be rotated in the correct direction to force the pin 3 into normal position with its enlarged portion 4 fitting snugly in the hole 7.

The clamp plates A and B are now ready to be attached or secured to the spoke of a truck wheel with the flange 2 of plate B in engagement with, or closely adjacent to, the inner face of the felly of said wheel. As the nut 5 is too large to pass entirely through the perforation 8 and as, when mounted as above mentioned, the felly will prevent any outward travel through the hole 7, it is obvious that the only way in which the pin 3 can be removed from the plate B, or a new pin inserted, is by the removal of the clamp from the spoke and the removal of the nuts 6 and 5, when the pin 3 may be worked out through hole 7.

To guard against the guard nut 6 being worked loose or off by the lock nut 5 the nut 6 will be threaded in the reverse direction to the threads of nut 5, or other suitable methods or means may be adopted to obviate this trouble.

In use, the lock-nut will be turned outwardly, when its outer face will engage the adjacent face of nut 6 and through it and stem 9 pull the pin 3 outwardly, exerting a great leverage, in case the enlarged end 4 is stuck in hole 7 by freezing or by other causes, to free the pin 3 from flange 2. As soon as the enlarged end 4 is free and the threads of nut 5 are free from the threads of the wall of perforation 8, the pin 3 may be shoved outwardly partially through flange 1 to allow the links of the two end portions of a chain to be slipped over the enlarged end 4, when the above operations will be reversed and the shoulders 11 of nut 5 bearing on shoulder 10 of pin 3 will force said pin toward flange 2 until the enlarged end 4 is in normal position in hole 7.

Any suitable materials may be used for any parts.

Having thus described my invention, what I claim as new and desire to secure by Letters Patent is:

1. A plate having two perforated flanges, in combination with a pin adapted to fit in the perforations of said flanges and releasable means for locking said pin in such position, said pin being so formed that it may be passed entirely through only one of said perforations.

2. A plate having two perforated flanges, in combination with a pin adapted to fit in the perforations of said flanges and releasable means for locking said pin in such position, said pin being so formed that it may be passed entirely through only one of said perforations and said locking means being mounted on said pin and of such dimensions that it may not be passed entirely through the other of said perforations.

3. A plate having a flange provided with an internally screw-threaded perforation and another flange provided with a hole of larger diameter than said perforation, in combination with a pin having one end portion corresponding in size and shape to said hole, and externally screw-threaded means adapted to be held to the other end of said pin to freely rotate thereon so that its threads may engage the threads in the wall of said perforation, to move said pin longitudinally in either direction and to lock it in normal position.

4. A plate having a flange provided with a perforation and another flange provided with a hole of greater dimensions than said perforation, in combination with a pin having one end portion corresponding in size and shape to said hole, and means adapted to be held to the said pin and to engage a fixed part to lock said pin in normal position with portions lying in said perforation and hole.

5. A plate having a flange provided with a perforation and another flange provided with a hole of greater dimensions than said perforation, in combination with a pin having one portion corresponding in size and shape to said hole, means working on said pin to engage a fixed part to lock said pin in normal position with portions lying in said perforation and hole, and means for holding said locking means on said pin.

6. A plate having two flanges, in combination with a pin and means for holding said pin in normal position with relation to said flanges, said means also preventing the separation of said pin from one of said flanges, though allowing motion thereof with relation to said flange when released by said means.

7. Two parts fixedly mounted with relation to, and at an interval from, each other, in combination with a third part normally lying transversely thereof, means for locking said third part in normal position, said means also preventing the disconnection of said third part from one of said first mentioned parts so long as said means remains on said third part.

In testimony whereof, I have signed my name to this specification.

WILLIAM H. McLAUGHLIN.